United States Patent [19]

Cage

[11] Patent Number: 4,738,144
[45] Date of Patent: Apr. 19, 1988

[54] DRIVE MEANS FOR OSCILLATING FLOW TUBES OF PARALLEL PATH CORIOLIS MASS FLOW RATE METER

[75] Inventor: Donald R. Cage, Longmont, Colo.
[73] Assignee: Micro Motion, Inc., Boulder, Colo.
[21] Appl. No.: 915,282
[22] Filed: Oct. 3, 1986
[51] Int. Cl.$^4$ .............................................. G01F 1/84
[52] U.S. Cl. .................................................. 73/861.38
[58] Field of Search .................... 73/861.37, 861.38; 335/261

[56] References Cited

U.S. PATENT DOCUMENTS

| Re. 31,450 | 11/1983 | Smith . | |
|---|---|---|---|
| 3,319,201 | 5/1967 | Coen | 335/231 X |
| 3,803,522 | 4/1974 | Rooney | 335/231 |
| 4,422,338 | 12/1983 | Smith . | |
| 4,491,025 | 1/1985 | Smith . | |

OTHER PUBLICATIONS

Micro Motion Model D Mass Flow Meters, Dec. 1985, Instruction Manual.

Primary Examiner—Herbert Goldstein
Attorney, Agent, or Firm—John V. Pezdek; William D. Palmer

[57] ABSTRACT

Improved drive means for oscillating the flow tubes of a parallel path Coriolis mass flow rate meter is described herein. The basic meter is known and comprises two substantially parallel flow tubes having oscillation axes and torsion axes. A pair of sensors sense the movement of the flow tubes about these axes with the time difference between the outputs of these sensors being indicative of the mass flow rate of the fluid. A drive means oscillates the tubes and comprises a coil and magnet-keeper arrangement. The present invention provides improved drive means comprising a rare earth-iron magnet having an annular configuration with a cup-shaped keeper member disposed thereabout to form an annular spacing. The magnet and keeper are affixed to the midpoint of one of the tubes. A coil is affixed to the other of the tubes with the coil interfitting into the annular spacing. The coil is so formed that the inductance does not exceed about nine millihenries. A drive circuit generates a periodic driving potential which provides a driving current in the range of from about 50 mA to about 250 mA. The driving force is determined by the product of the drive current times coil turns times a predetermined constant. The drive means has a lower stored energy capability allowing the meter to be used in dangerous atmospheres such as hydrogen.

7 Claims, 7 Drawing Sheets

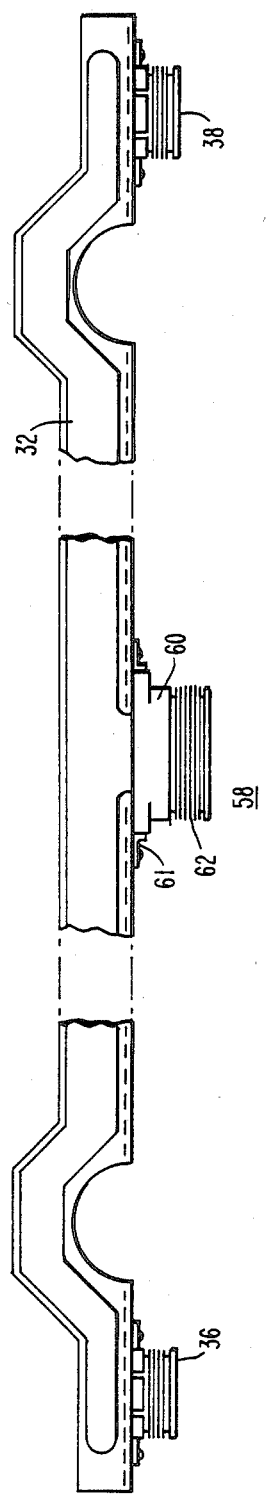
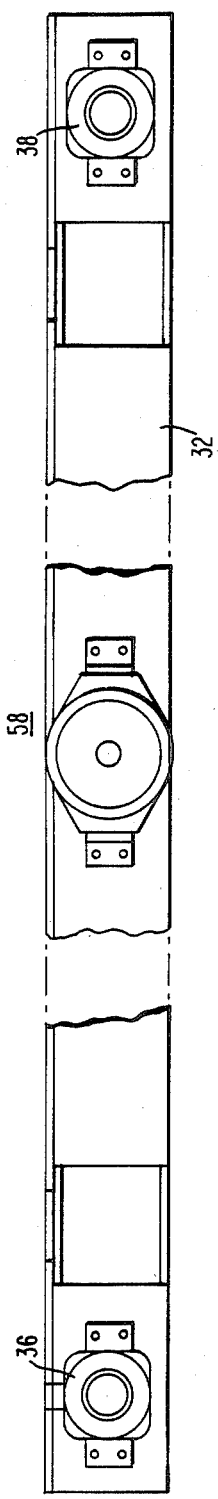

DRIVE MEANS FOR OSCILLATING FLOW TUBES OF PARALLEL PATH CORIOLIS MASS FLOW RATE METER

BACKGROUND OF THE INVENTION

This invention relates to parallel path Coriolis mass flow rate meters and, more particularly, to an improved drive means for such a meter which permits it to be used in a wide variety of dangerous atmospheres, including hydrogen.

Coriolis mass flow rate meters are well known and are described in U.S. Pat. Nos. Re. 31,450, dated Nov. 29, 1983 to J. E. Smith and 4,422,338 dated Dec. 27, 1983 to J. E. Smith. A parallel path Coriolis mass flow rate meter is described in U.S. Pat. No. 4,491,025 dated Jan. 1, 1985 to J. E. Smith et. al., with all of these patents assigned to Micro Motion, Inc., the assignee of the present application. The detailed construction and operation of parallel path mass flow meters is set forth in Instruction Manual, Micro Motion Model "D" Mass Flow Meters dated December 1985 which is incorporated herein by reference. In general, the drive means used in a Coriolis mass flow rate meter comprises a coil and permanent magnet arrangement. A cylindrical AL-NICO magnet is mounted on a beam having holes therein for closely receiving the magnet. The beam is then fixed to one of the flow tubes of the flow meter by conventional techniques such as welding or brazing. The longitudinal axis of the magnet is coincident with the centerline of a coil mounted on a second beam provided on the other parallel flow tube. One end of the magnet extends into the interior opening of the coil. The size of the magnet, the diameter and the number of windings of the coil is dependent on the size of the flow tubes that are to be driven. The coil is driven with a square wave or since wave driver amplifier circuit. The driver circuit is configured as a open loop servo circuit. Back-to-back zener diodes can be used to limit the inductive discharge spike of the coil to keep the energy level of the coil low to maintain an intrinsically safe rating. However, these diodes will limit the amount of drive current to the coil.

With the foregoing construction of mass flow meters, the flow of viscous liquids through the flow tubes can present problems because the damping of the flow tubes increases and, at times, the drive circuit will not keep the tubes in oscillation. Thus, it would be advantageous to have a means for increasing the drive power available. To increase the drive power, more turns of wire in the drive coil or larger permanent magnets in the drive can be used, but these are not satisfactory solutions. Increasing the magnet size increases the total mass added to the flow tubes which detracts from the balanced system. Additional mass also increases the momentum of the system and this makes the flow tube less responsive to the Coriolis forces. Additional mass also introduces other vibration modes into the system. To compensate for the increased mass of a drive assembly, stiffening of the mounting beam and additional mass further out from the centerline of the drive assembly mounting is required which, in turn, increases the total weight of the system and so on.

Adding more turns of wire increases the inductance of the drive coil and the inductance increases as the square of the length of the wire. Resistance increases linearly. A greater coil resistivity means that less current is necessary to drive the coil but since inductance increases at a square rate, the coil has a much larger stored energy capability. The stored energy restricts the applications into which the flow meter can be placed. In this regard, reference is made to Article 500 of the National Electrical Code (NEC) which will be referred to hereinafter. To enable a meter to be certified for Class I, Groups A and B (a hydrogen environment), referred to hereinafter, the total stored energy of the drive coil cannot exceed certain limits.

Limiting the stored energy of a drive coil means that it is deliberately designed to be inefficient, and this is contrary to usual design practices which stress efficiency. In addition, the mass constraints imposed limit the amount of iron and magnet that can be used and this in turn effects the volume of air gap and amount of wire in the coil.

SUMMARY OF THE INVENTION

There is provided in combination with a parallel path Coriolis mass flow rate meter, an improved drive means. The basic meter comprises a housing member including an inlet manifold and an outlet manifold. Two substantially parallel continuous flow tubes have adjacent ends fixedly mounted in fluid tight manner to the inlet manifold and to the outlet manifold so that fluid entering into the inlet manifold flows in parallel fashion through the tubes and exits therefrom into the outlet manifold. Each of the tubes has an oscillation axis about which axes the flow tubes can be oscillated like tines of a tuning fork. Each of the tubes also has a torsion axis about which axes the flow tubes move due to the Coriolis forces generated by the flow of fluid through the tubes when oscillated. The flow tubes each have essentially equal moments of inertia and essentially equal spring constants about the oscillation axes and essentially equal moments of inertia and spring constants about the torsion axes. In addition, the tubes have a resonant frequency of oscillation about the torsion axes which is different from both the resonant frequency of oscillation about the oscillation axes and harmonics thereof. A pair of sensor means serve to sense the movement of the flow tubes about the oscillation axes and the torsion axes and there is produced an output signal representative of the actual movement of the flow tubes. There is also provided a time difference measuring means for determining the time difference between the output signals with the time difference being indicative of the mass flow rate of the fluid passing the tubes. A drive means serves the oscillate the flow tubes about the oscillation axes and comprises a permanent magnet and keeper assembly mounted about one of the flow tubes and an annular coil means mounted about the other of the flow tubes. The magnet and keeper assembly interfit with the coil means. A drive circuit means connected to the coil is used to oscillate the flow tubes at their resonant frequency about the oscillation axes.

The improved drive means of the present invention comprises a permanent magnet comprising a rare-earth magnet of samarium cobalt iron or neodymium iron and having an annular configuration. A cup-shaped keeper member is concentrically disposed with respect to and about the annular magnet and forms therewith an annular-conformed spacing of predetermined dimensions. The permanent magnet and keeper member are affixed to one of the flow tubes proximate its midpoint with the annular-conformed spacing facing the other flow tube. The coil means comprises electrically conducting insulated wire having a predetermined number of turns wound in an annular configuration. The coil means interfit with the annular-conformed spacing formed between the permanent magnet and the keeper. The coil means is affixed to the other of the flow tubes proximate its midpoint and interfits within a portion of the annular-conformed spacing. By varying the coil dimensions and turns, its inductance ranges from about 320 microhenries to about nine millihenries. The coil means can also be wound on a bobbin made or metal or of insulating material such as ceramic or plastic and having an annular configuration. The coil means and bobbin are made to interfit within a portion of the annular conformed spacing. A drive circuit is adapted to be connected to the coil to oscillate the flow tubes. The drive circuit and the resistance of the coil provide a drive current in the range of from about 50 mA to about 250 mA. A predetermined maximum driving force can be produced by the driving means when energized.

BRIEF DESCRIPTION OF THE DRAWINGS

For a better understanding of the invention, reference should be made to accompanying drawings wherein:

FIG. 4 is a plan view of the bobbin and coil attached to the beam member which, in turn, is to be affixed to the other of the parallel tubes, with the sensor coils affixed proximate the beam ends;

FIG. 5 is an elevational view of the bobbin and coil and beam as shown in FIG. 4;

DETAILED DESCRIPTION

Figure 1:
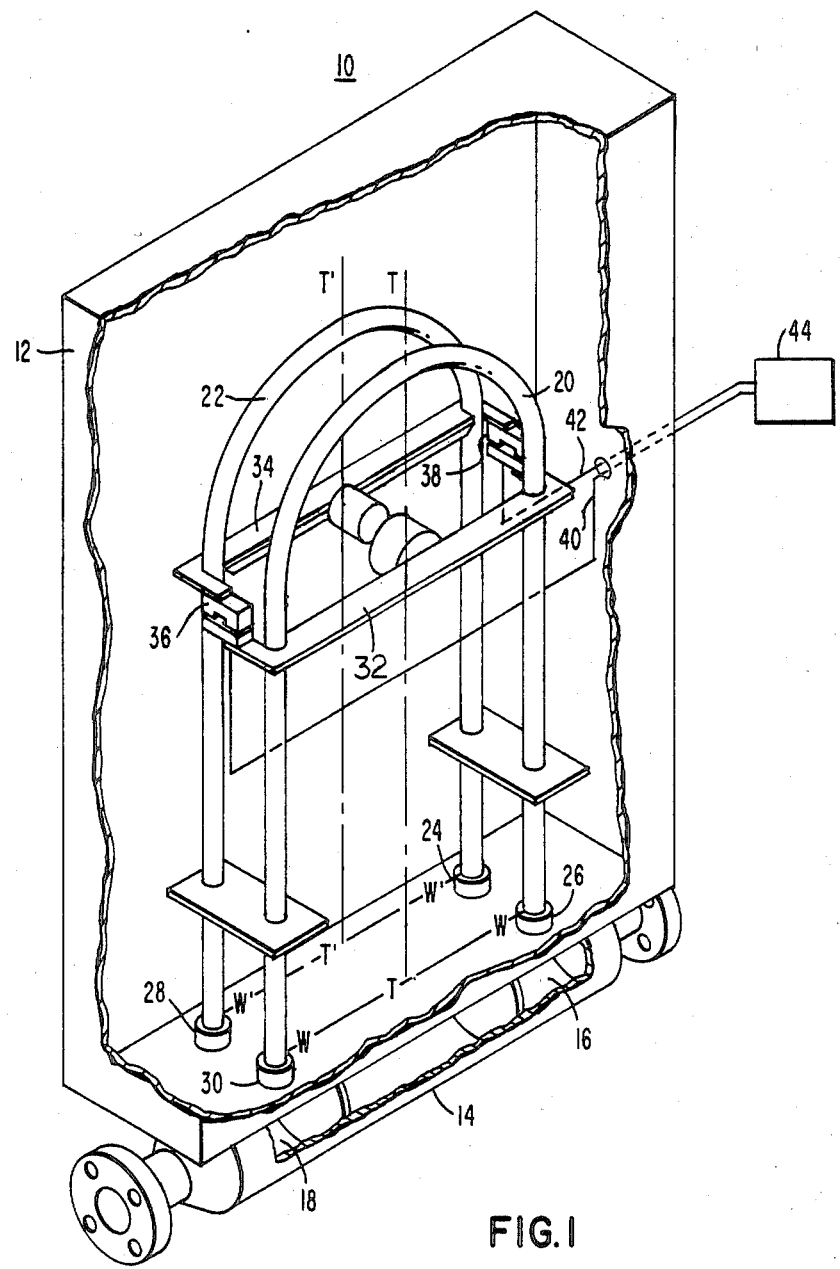
FIG. 1 is an isometric view, partly broken away, of a parallel path Coriolis mass flow rate meter.

With specific reference to the form of the invention illustrated in the drawings, in FIG. 1 is shown a Coriolis mass flow meter 10 which has the outer casing 12 broken away. The meter comprises a housing member 14 including an inlet manifold 16 and an outlet manifold 18. Two substantially parallel continuous flow tubes 20 and 22 have adjacent ends 24, 26 and 28, 30 fixedly mounted in a fluid tight manner to the inlet manifold and the outlet manifold so that fluid entering into the inlet manifold 16 flows in parallel fashion through the tubes 20, 22 and exits therefrom into the outlet manifold 18.

Each of the tubes 20, 22 has an oscillation axis W—W and W'—W' about which axes the tubes can be oscillated like the tines of a tuning fork by a drive means comprising a magnet and coil assembly. Each of the tubes also has a torsion axis T—T and T'-T' about which axes the tubes move due to the Coriolis forces generated by the flow of fluid through the tubes when oscillated. The flow tubes each have essentially equal moments of inertia and essentially equal spring constants about the oscillation axes as well as essentially equal moments of inertia and essentially equal spring constants about the torsion axes. The resonant frequency of oscillation about the torsion axes is different from both the resonant frequency of oscillation about the oscillation axes and harmonics thereof.

Beam members 32 and 34 are affixed to each of the tubes 20 and 22 and carry sensor means 36 and 38 for sensing the movement of the flow tubes about the oscillation and torsion axes. Each sensor unit produces an output signal representative of the actual movement of the tubes, which signals are transmitted through conductors 40 and 42. The signals are fed into a time difference measuring means, shown in block form as 44, for determining the time difference between the output signals with the time difference being indicative of the mass flow rate of the fluid passing through the flow tubes. In general, each sensor means comprises a coil placed on one of the flow tubes and positioned within a uniform magnetic field produced by a permanent magnet placed on the other flow tube adjacent the coil. With the flow tubes being oscillated by the drive means, a signal is produced by the coil moving within the magnetic field. Normally the coils for the sensor means and the drive means are mounted on one of the flow tubes with their respective magnets being mounted on the other flow tube. For a more detailed description of the sensor units and the circuits used therewith see the Instruction Manual, referred to in the Background Section. The time difference measurement is representative of the phase shift between the output signals caused by the Coriolis force. Thus, the time difference circuit can also be called a phase difference circuit.

Figure 2:
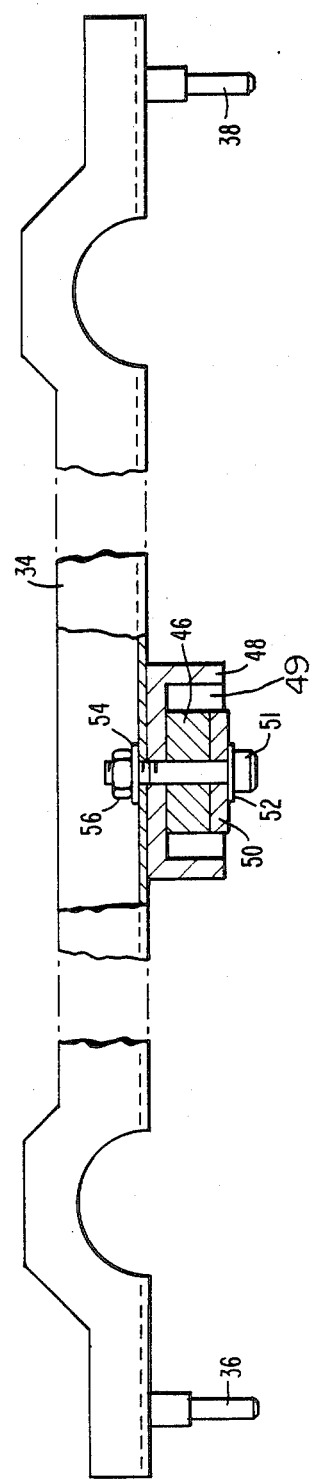
FIG. 2 is a plan view, partly in section, showing the magnet and keeper attached to the beam member which in turn is to be affixed to one of the parallel tubes, with motion sensors carried proximate the beam ends.

In FIGS. 2–5 are shown detailed drawings for drive means for oscillating the flow tubes about their oscillation axes. Referring to FIG. 2, there is shown in sectional view a magnet member 46 which has an annular configuration. The magnet comprises a rare-earth magnet of samarium cobalt iron (commonly known as samarium cobalt) or neodymium iron. Both of these materials are well known in the art. Of the two magnets, samarium cobalt is preferred because of its higher temperature rating. At relatively low temperatures, the neodymium iron is preferred because of its higher relative magnetic strength when compared to samarium cobalt (approximately twice as strong). The samarium cobalt is about three times as strong as the "ALNICO" magnet that is currently used.

Figure 3:
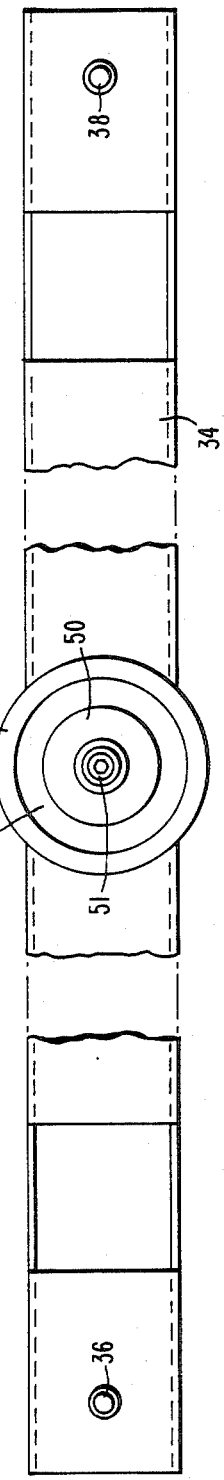
FIG. 3 is an elevational view of the magnet and keeper and beam as shown in FIG. 2.

A cup-shaped keeping member 48 is formed of cold rolled steel or soft iron and is concentrically disposed with respect to the magnet 46 as shown in FIG. 3, with an annular-conformed spacing 49 of predetermined dimensions formed therebetween. The magnet 46 and keeper 48 are affixed to the midpoint of the beam member 34 together with a pole member 50 by a magnetically non-permeable bolt member 51 with suitable spring washer 52, lock washer 54 and retaining nut 56. The beam member 34 is adapted to receive a flow tube proximate its ends and the flow tube is affixed thereto by conventional means such as welding or brazing. One half of the sensor members 36 and 38, typically the magnet, is also carried proximate the ends of the beam 34. The keeper 48 and pole member 50 are used to provide a path of high magnetic permeability for the magnetic flux of the magnet 46 in the spacing 49. A magnetically non-permeable bolt member is used so as not to shunt the magnetic field of the magnet 46. Because of differences in thermal expansion coefficients between the magnet 46, keeper 48 and pole member 50, the spring washer 52 is used to take up the expansion differences between the pieces. This plus the magnetic attraction and static friction prevent translational movement between these pieces. In addition to further ensure the integrity of this subassembly, the retaining nut 56 can be glued or welded to the bolt member 51.

In FIGS. 4 and 5 are shown details for the coil and bobbin member 58 which is carried by the beam member 32 proximate its midpoint. The bobbin 60 is formed of plastic, ceramic material or metal having an annular configuration and it is affixed to the beam 32 such as by spot welding support member 61. Wound on the bobbin 60 is a coil 62 comprising electrically conducting insulated wire having a predetermined number of turns, as discussed hereinafter. The bobbin 60 and coil 62 are sized to interfit into the annular-conformed spacing 49 formed between the permanent magnet 46 and keeper 48. The beam 32 is adapted to retain a flow tube proximate the ends thereof and the remaining portion, typically the coil, of the sensor members 36 and 38 are carried proximate the ends thereof. The coil dimensions and keeper-magnet dimensions are such that approximately 0.035 inch (0.889 mm) gap is provided between any surface of the coil and bobbin member and the magnet and keeper. In operation of the unit, a portion of the coil 62 interfits into the annular-conformed spacing 49 between the magnet 46 and keeper 48.

Where the coil can maintain its annular shape, the bobbin 60 is not required. When bobbin 60 is used, it is preferable that it be non-magnetic and non-conductive. In high temperature applications, for example, temperatures in excess of 150 degrees C., a metal bobbin is preferred. Also, when winding the coil, care is taken so as not to damage the wire insulation that could cause electrically short-circuited turns. Typically, the wire insulation is varnish although other well known types are insulation could also be used.

Figure 6:
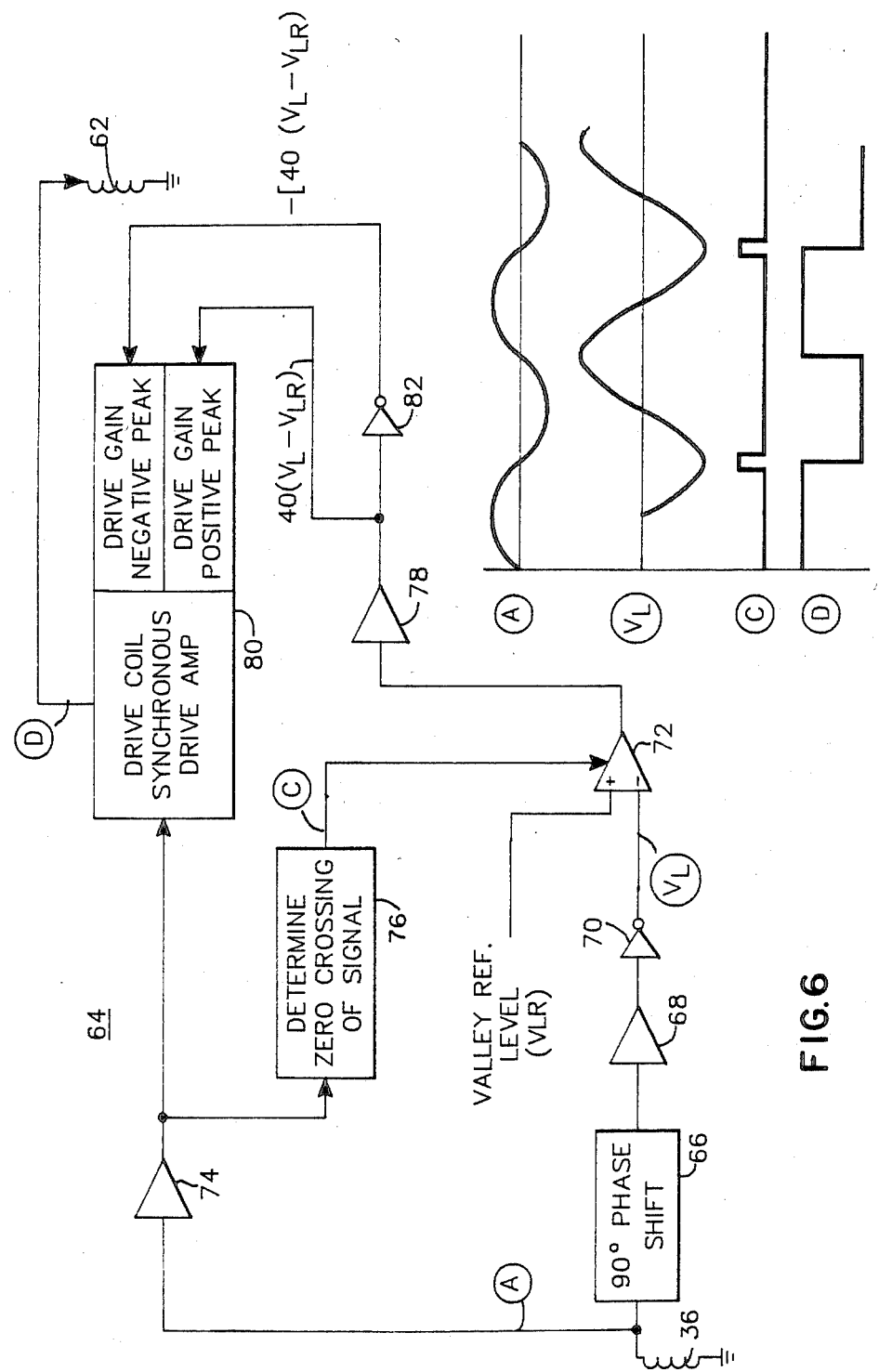
FIG. 6 is a block type representation of a driving circuit for actuating the present driving means.

A simplified drive circuit 64 shown in block form in FIG. 6 is adapted to be connected to the coil 62 to oscillate the flow tubes. The drive circuit generates a square wave output having a peak amplitude of 15 volts and a frequency of between 30 Hz to 100 Hz. The frequency of oscillation is chosen so that the flow tubes are driven at their natural frequency about their respective oscillation axes. Drive circuits are also described in the Instructional Manual, referred to in the Background Section and can be used. The drive circuit 64 functions as an open loop servo. Tube movement is sensed by using one of the two sensor means used to sense tube travel. Sensor means 36 is chosen for purposes of illustration. The sensor signal, which is a velocity signal, is amplified at amplifier 74, the output of which serves as a sync signal for the drive amplifier 80 for the drive coil 62. The sync signal is also processed by a zero crossing detector 76 to determine when the flow tube approaches zero velocity from a negative going direction. Zero velocity of the tube occurs at the positive and negative peaks of the sensor velocity signal hereinafter called the peak and valley points. The sensor velocity signal is also phase shifted by 90 degrees, amplified and inverted by integrator 66, amplifier 68, and inverter 70, respectively. Integrating the sensor signal produces a position signal that is used to provide a signal representative of the magnitude of the peak and valley positions. Both the valley and peak zero velocity points could be sensed; however, symmetry is assumed so only the occurrence of one of the zero velocity points needs to be determined. The valley position was chosen.

When the zero velocity valley is determined, the valley position signal $V_L$ is sampled and compared to a predetermined valley reference signal $V_{LR}$ at the difference amplifier 72. The valley reference signal serves as the maximum drive gain limit. The difference signal between these two signals, which is the output of amplifier 72, is amplifier by amplifier 78 and serves as the positive gain limit of the drive amplifier 80. At inverter 82, the amplified difference signal is inverted and serves as the negative gain limit for the drive amplifier 80. The drive signal to the drive coil 62 is synchronous with the velocity signal from sensor 36. As the amplitude of the drive signal increases, the amplitude of the sensor velocity signal will also increase thus decreasing the difference signal. This, in turn, will decrease the gain limits of the drive signal. When the difference signal is reduced to zero, the drive signal will remain at its then current magnitude.

When the meter is first energized and the flow tubes are motionless, there theoretically should be no velocity signal. However, the coil of sensor 36 will act as an antenna and will pickup stray electrical signals which will act to trigger the drive circuit 64 allowing the drive amplifier 80 to produce the drive signal. In addition, stray mechanical vibrations can induce some tube movement to help start the tubes vibrating. Once the tubes start vibrating, the circuit will function as described.

Figure 7:
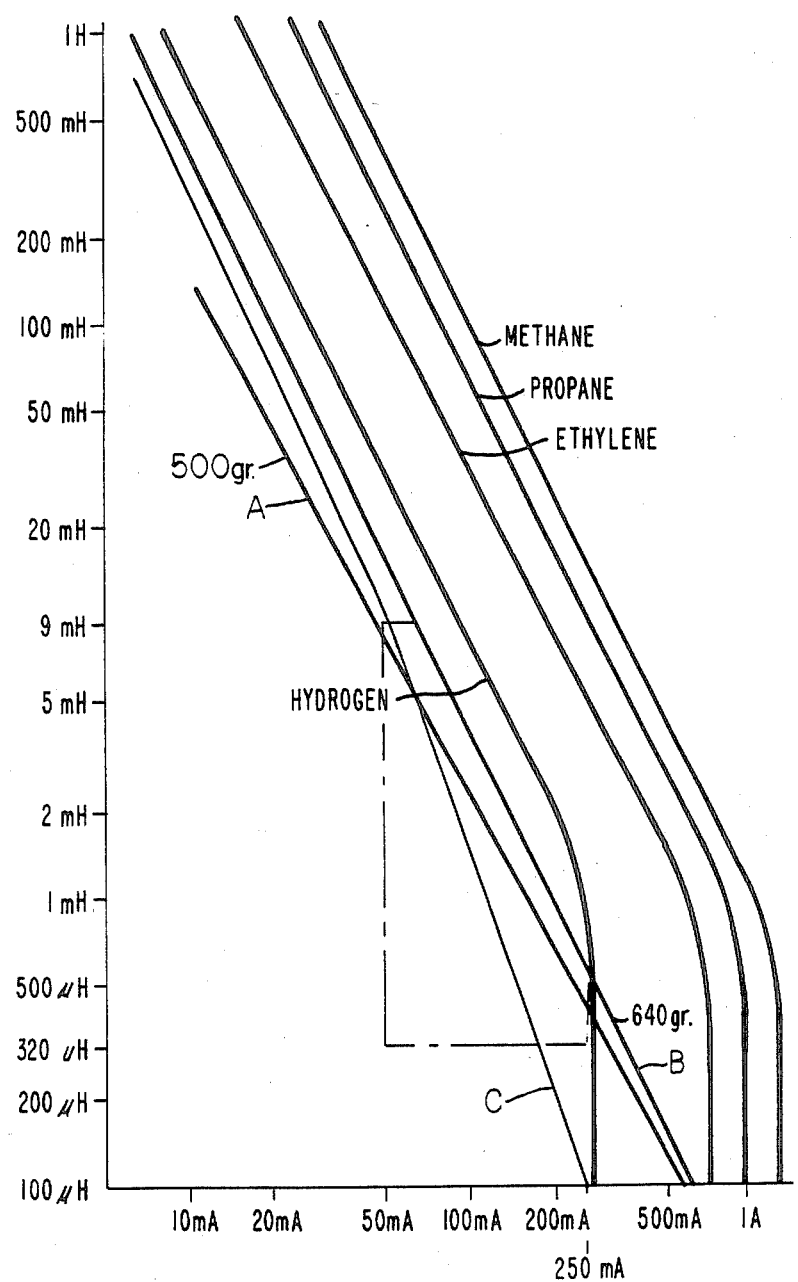
FIG. 7 is a graph of coil inductive v. coil current having inscribed thereon a series of curves which establish the groupings for permissable operation of meters.

In order for the present meters to operate in dangerous environments, including hydrogen, they must be certified for Class I, Groups A and B, [see Article 500 of the National Electric Code (NEC)]. To achieve such certification, the total stored energy of the drive coil cannot exceed the limits set forth in the aforementioned article. FIG. 7 shows a set of such NEC design curves for inductive circuits for the various classes and environments. If the inductance at a given current is to the left of a curve, it is assumed to be safe for the group represented by that curve.

Referring to FIG. 7, to be certified for Groups A and B, the present drive coil is designed to have an inductance of from about 320 microhenries to about 9 millihenries, as shown by the dashed lines, so as to limit the stored energy potential of the drive coil. In addition, the drive circuit and resistances of the drive coil and associated resistances should be such as to provide a drive current in the range of from about 50 mA to about 250 mA, shown by the dashed lines. For the range of drive current given, if the maximum driving force the coil can produce is limited to about 640 grains, and preferably about 500 grains, the operating point for the coil will normally fall to the left of the curve which defines Groups A and B. Also shown on FIG. 7 are lines A and B for a constant force of 500 grains and a constant force of 640 grains, respectively.

A further factor is present in that a thirty-five ohm resistor is placed in series with the drive coil to limit current. With a 100 turn coil, which has a relatively small resistance, the effect of such a resistor is substantial, but with a 500 turn coil, which has a much larger resistance, the effect of the added resistor is minimal. The effect of this resistor is shown by the in-circuit operating curve, line C. In comparing line A and line C, the same 100 turn coil having an inductance of 320 microhenries (uH) and that produces 500 grains of force on the constant force line A at 256 mA of current produces only 356 grains of force when placed in the drive circuit. This is due to the current limiting effect of the 35 ohm resistor. The in-circuit operating line, line C, will asymptotically approach a constant force line and will be parallel but to the left of it due to the offset caused by the 35 ohm resistor. For the drive coils tested, the constant force line asymptote would occur at about 640 grains.

In the following Tables are listed performance data for various coil designs of 100, 200, 300, 400, and 500 turns. The inductance of the coils was measured. The current values given in the second column of Table I were determined by assuming an operating voltage of 15 volts divided by the resistance of the coil. The current values given in the fifth column of Table I represent in-circuit operating points and were determined by dividing 15 volts by the sum of the coil resistance and the 35 ohm current limiting resistor. The force values given in the last column of Table I are those obtained when the coil is in the operating circuit that includes the current limiting resistor. For smaller coils the maximum force, in grains, is substantially decreased due to the effect of the 35 ohm resistor.

TABLE I

| Coil Turns | I max mA | Inductance | R Coil ohms | I oper mA | F max grains |
|---|---|---|---|---|---|
| 100 | 256 | 320 uH | 47.5 | 182 | 356 |
| 200 | 118 | 1.67 mH | 91.1 | 119 | 465 |
| 300 | 85 | 3.26 mH | 137 | 87 | 510 |
| 400 | 64 | 5.7 mH | 186 | 68 | 532 |
| 500 | 51 | 8.9 mH | 231 | 56 | 547 |

TABLE II

| | Constant 640 Grain Force | | |
|---|---|---|---|
| Coil Turns | mA | Inductance | F grains |
| 100 | 326 | 320 uH | 640 |
| 200 | 163 | 1.67 mH | 640 |
| 300 | 108 | 3.26 mH | 640 |
| 400 | 81 | 5.7 mH | 640 |
| 500 | 65 | 8.9 mH | 640 |

The 500 grain constant force line was chosen for illustrative purposes. Other constant force lines such as those for 400 grains or 300 grains could also be drawn in FIG. 7. In making calculations for both the 500 grain and 640 grain constant force lines, the current values were determined by first dividing the constant force value by a predetermined constant, 0.0196 grains force per milliampere-turn, to determine the milliampere-turns. This value was then divided by the number of turns to reach the current value. These current and inductance points were then plotted to produce the constant force line. Table II presents the current and inductance values used to plot the 640 grain constant force line, line B of FIG. 7.

The predetermined constant for the coil is a function of the gap, the geometry, and the materials with the gap having the greatest effect on the magnitude of this constant. The constant of 0.0196 grains force per milliampere-turn is for a given gap, mean coil diameter, and magnet. Any change in the gap, geometry, or materials will change the value of this constant. Decreasing the amount of the gap between the coil and the magnet or increasing the strength of the magnet would increase the value of this constant. Similarly, decreasing the diameter of the magnet or increasing the gap would decrease the value of this constant. In general this constant is determined from the equation:

$$F = BIL$$

where F is the force, I is the current, L is the length of wire in the coil and B is the flux density. Solving this for the flux density B, the equation can be rewritten as:

$$B = F/IL$$

and would have units of grains per milliampere-turn. The unit "turn" is based on the mean diameter of the coil and, thus, the number of turns is directly related to the wire length and can be substituted for L term.

Figure 8:
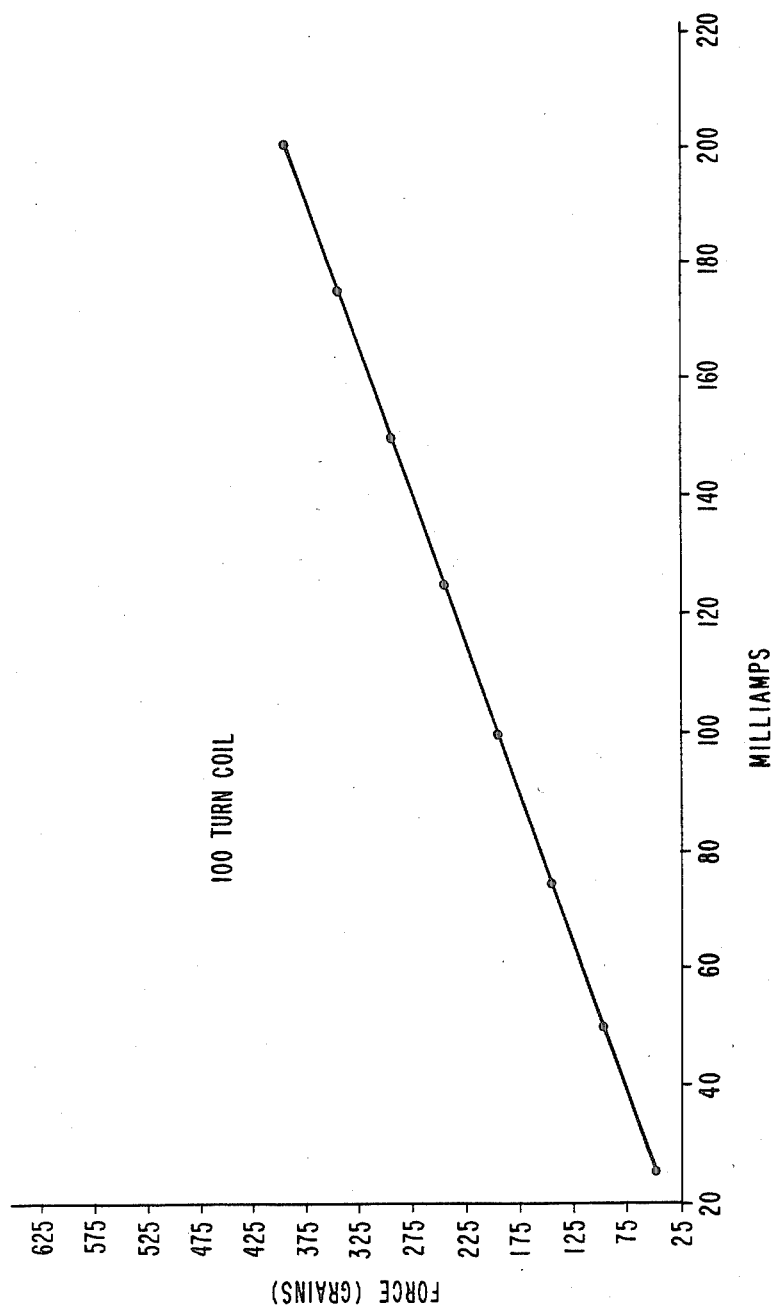
FIG. 8 is a graph of Force v. Milliamperes for a specific coil of 100 turns.
Figure 9:
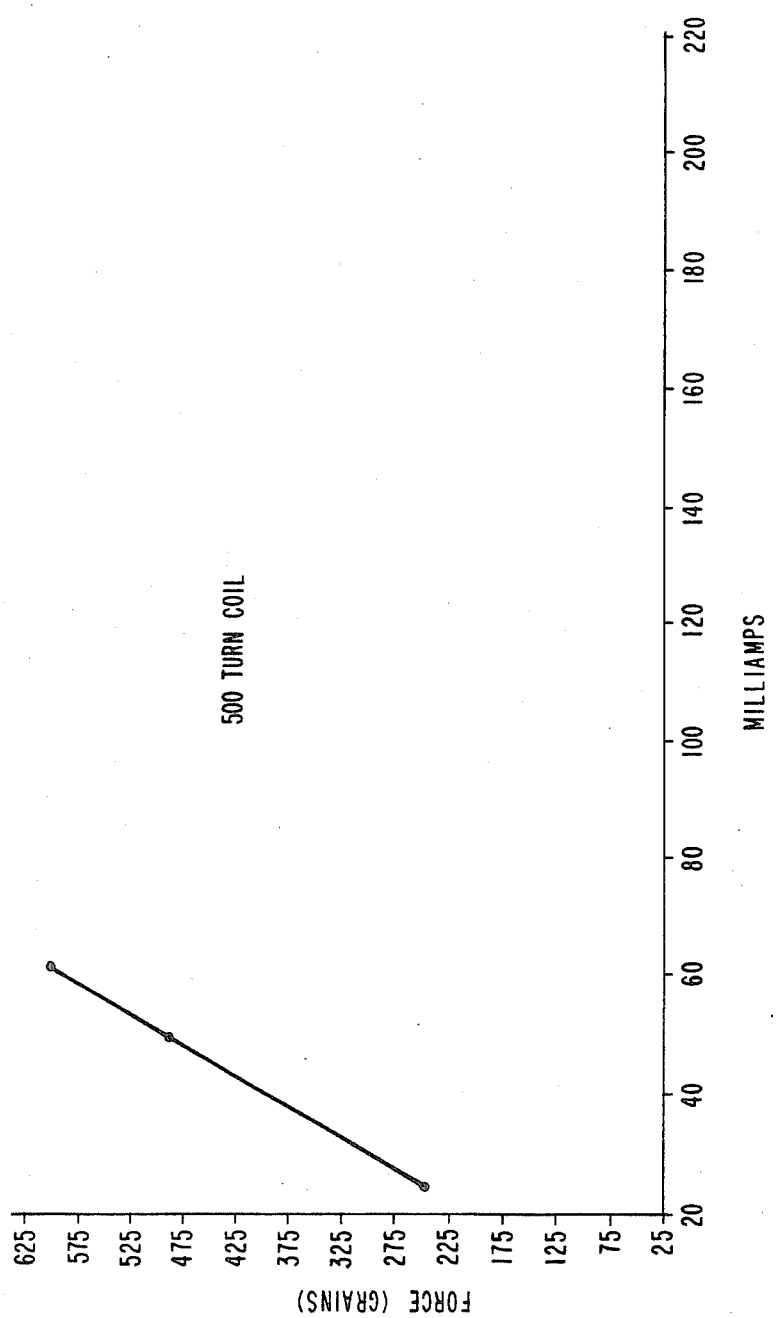
FIG. 9 is a graph of Force v. Milliamperes for a specific coil of 500 turns.

In FIGS. 8 and 9 are shown curves of force versus milliamps for 100 turn coils and 500 turn coils, both using 44 gage wire. As would be expected, the slope of the curve for the 500 turn coil is much greater than that of the 100 turn coil. As a practical matter, the number of turns of the present coils are limited to from about 100 turns to about 500 turns. In the case of a 100 turn coil, for example, the maximum driving force that the coil can produce is about 640 grains, as shown in the Tables, and still remain within the desired operating region shown in FIG. 7. When the series resistor is included, however, the maximum force obtained will decrease. In the case of a coil having more than about 500 turns, the coil becomes quite bulky.

As compared to existing drive designs, the new designs effect a weight savings of approximately 50% while achieving an increase in maximum driving force of about 27% to about 60% when the same drive current is used, depending on design parameters. It should be realized that although the drive means of the present invention is shown mounted on U-shaped flow tubes, the shape of the flow tubes should not be considered as limiting in any sense the application of the invention. Straight flow tubes, loop shaped flow tubes, and S-shaped flow tubes can be oscillated by the drive means. Other embodiments of the invention will be apparent to those skilled in the art from consideration of this specification. It is intended that the specification be considered as exemplary only with the true scope and spirit of the invention being indicated by the following claims.

What is claimed is:

1. In combination with a parallel path Coriolis mass flow rate meter for measuring the mass flow rate of a fluid, comprising:

a housing member including an inlet manifold and an outlet manifold, two substantially parallel continuous flow tubes, said flow tubes having adjacent ends fixedly mounted in a fluid tight manner to said inlet manifold and said outlet manifold so that fluid entering into said inlet manifold flows in parallel fashion through said flow tubes and exits therefrom into said outlet manifold;

each of said flow tubes having an oscillation axis about which axes said flow tubes can be oscillated like tines of a tuning fork, and each of said flow tubes having a torsion axis about which axes said flow tubes move due to the Coriolis forces generated by the flow of said fluid through said flow tubes when oscillated;

said flow tubes each having essentially equal moments of inertia and essentially equal spring constants about said oscillation axes and essentially equal moments of inertia and essentially equal spring constants about said torsion axes, and said tubes having a resonant frequency of oscillation about said torsion axes which is different from both the resonant frequency of oscillation about said oscillation axes and harmonics thereof;

a pair of sensor means for sensing the movement of said flow tubes about said oscillation and torsion axes, each said sensor means producing an output signal representative of the actual movement of said flow tubes;

time difference measuring means for determining the time difference between said output signals with said time difference being indicative of the mass flow rate of the fluid passing through said flow tubes;

drive means for oscillating said flow tubes about said oscillation axes and comprising permanent magnet and keeper assembly mounted about one of said flow tubes and coil means mounted about the other of said flow tubes, said permanent magnet and keeper assembly interfitting with said coil means; and drive circuit means adapted to be connected to said coil to oscillate said flow tubes at said resonant frequency about said oscillation axes, said drive circuit generating a periodic wave of predetermined frequency, and said drive circuit and the resistance of said coil providing a drive current in the range from about 50 mA to about 250 mA, the improved drive means consisting essentially of:

said permanent magnet comprising a rare earth magnet of samarium cobalt iron or of neodymium iron and having an annular configuration, a cup-shaped keeper member concentrically disposed with respect to and about said annular magnet forming an annular-conformed spacing of predetermined dimensions between said permanent magnet and said keeper member, and said permanent magnet and said keeper member affixed to one of said flow tubes proximate its midpoint with said annular conformed spacing facing said other flow tube; and said coil means comprising electrically conducting insulated wire having a predetermined number of turns wound in an annular configuration, said coil means sized to interfit into said annular-conformed spacing formed between said permanent magnet and said keeper, said coil means affixed to the other of said flow tubes proximate its midpoint to interfit within a portion of said annular confirmed spacing, and said coil means having such turns and dimensions that its inductance is from about 320 microhenries to about nine millihenries.

2. The combination as specified in claim 1, herein said predetermined number of coil turns is from about 100 turns to about 500 turns.

3. The combination as specified in claim 1, wherein the maximum driving force in grains said drive means can produce is calculated by multiplying the maximum current in milliamperes which the drive means can supply by the number of turns of said coil by the constant 0.0196.

4. The combination as specified in claim 1 wherein said coil means further comprises a bobbin portion having an annular configuration and having wound thereon said wire of predetermined number of turns.

5. The combination as specified in claim 1 wherein said bobbin portion is of a nonconductive and nonmagnetic material.

6. The combination as specified in claim 1, wherein the maximum driving force said drive means can produce does not exceed about 640 grains.

7. The combination as specified in claim 1, wherein the maximum driving force said drive means can produce does not exceed about 500 grains.

* * * * *